(12) United States Patent
Tian et al.

(10) Patent No.: US 9,087,548 B2
(45) Date of Patent: Jul. 21, 2015

(54) CONTROL CIRCUIT FOR HARD DISK DRIVE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Bo Tian, Shenzhen (CN); Kang Wu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 194 days.

(21) Appl. No.: 13/928,426

(22) Filed: Jun. 27, 2013

(65) Prior Publication Data

US 2014/0313611 A1    Oct. 23, 2014

(30) Foreign Application Priority Data

Apr. 23, 2013 (CN) .......................... 2013 1 01421361

(51) Int. Cl.
G11B 15/18 (2006.01)
G11B 15/46 (2006.01)
G11B 19/20 (2006.01)

(52) U.S. Cl.
CPC ................................ *G11B 19/2054* (2013.01)

(58) Field of Classification Search
CPC ...... G11B 19/28; G11B 19/20; G11B 5/6005; G11B 5/59633; G11B 2220/20; G11B 27/11; G11B 5/59688; G06F 1/30; G06F 1/3203; G06F 12/0866
USPC .................. 360/75, 71, 69, 60, 73.03, 78.07; 713/340, 310, 320; 711/113
See application file for complete search history.

(56) References Cited

U.S. PATENT DOCUMENTS 8,074,016 B2 * 12/2011 Ahmad et al. ................ 711/113

* cited by examiner

*Primary Examiner* — Nabil Hindi
(74) *Attorney, Agent, or Firm* — Novak Druce Connolly Bove + Quigg LLP

(57) ABSTRACT

A control circuit for a hard disk drive (HDD) includes a control chip, a connector connected between the control chip and a motherboard, and a function transform circuit connected between the control chip and the connector. A status pin of the control chip is connected to a status receiving pin of the connector through the function transform circuit, to send a working state signal of the hard disk drive to the status receiving pin of the connector. The status receiving pin shows a normal operation of the HDD through a light emitting diode connected to the status receiving pin. The function transform circuit provides a high level signal to a staggered spin-up pin of the control chip, to make the control chip control the hard disk drive to execute staggered spin-up function.

7 Claims, 1 Drawing Sheet

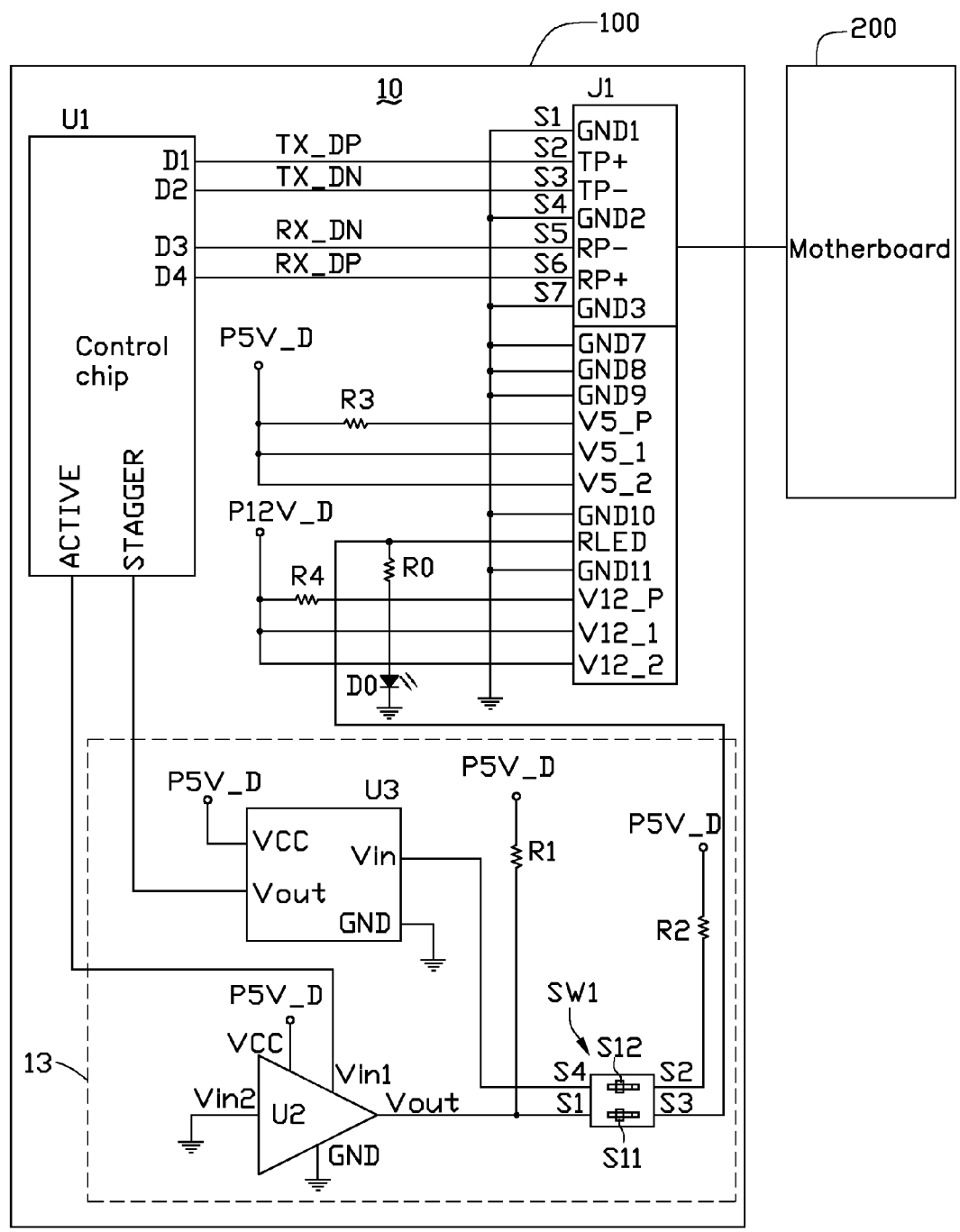

CONTROL CIRCUIT FOR HARD DISK DRIVE

BACKGROUND

1. Technical Field

The present disclosure relates to a control circuit for a hard disk drive.

2. Description of Related Art

One function of a hard disk drive (HDD) is a normal operation state (ACTIVE), which is used to show whether the HDD operates normally. Another function is a staggered spin-up, which allows a computer to spin up the HDDs in sequence to reduce load on a power supply when booting. However, a normal design of HDD usually includes the function of the ACTIVE. The function of the staggered spin-up may be lacking from the design, and thus not present. Thus, the HDD can carry out the function of the ACTIVE only.

Therefore, there is need for improvement in the art.

BRIEF DESCRIPTION OF THE DRAWING

Many aspects of the present disclosure can be better understood with reference to the following drawing(s). The components in the drawing(s) are not necessarily drawn to scale, the emphasis instead being placed upon clearly illustrating the principles of the present disclosure. Moreover, in the drawing(s), like reference numerals designate corresponding parts throughout the several views.

The figure is a circuit diagram of an embodiment of a control circuit for a hard disk drive.

DETAILED DESCRIPTION

The figure is a circuit diagram of an embodiment of a control circuit 10 for a hard disk drive (HDD) 100. The control circuit 10 includes a control chip U1, a connector J1, and a function switch unit 13. The connector J1 allows a connection to another electronic device, such as a motherboard 200, to achieve communication between the HDD 100 and the motherboard 200. The connector J1 is connected to the control chip U1. The function switch unit 13 is connected between the control chip U1 and the connector J1.

The control chip U1 includes a status pin ACTIVE, a staggered spin-up pin STAGGER, and first to fourth data pins D1-D4. The status pin ACTIVE shows normal operation of the HDD 100. The staggered spin-up pin STAGGER is used to carry out a function of staggered spin-up of the HDD 100.

The connector J1 includes a first sending pin TP+, a second sending pin TP−, a first receiving pin RP−, a second receiving pin RP+, and a status receiving pin RLED. The first data pin D1 of the control chip U1 is connected to the first sending pin TP+ of the connector J1. The second data pin of the control chip U1 is connected to the second sending pin TP− of the connector J1. The third data pin D3 of the control chip U1 is connected to the first receiving pin RP− of the connector J1. The fourth data pin D4 of the control chip U1 is connected to the second receiving pin RP+ of the connector J1. The first data pin D1 and the second pin D2 of the control chip U1 receive data from the connector J1. The third data pin D3 and the fourth data pin D4 send data to the connector J1. Thus, the control chip U1 controls data transmission between the HDD 100 and the motherboard 200.

The function switch unit 13 includes a first buffer U2, a second buffer U3, and a switch SW1. In the embodiment, the switch SW1 is a slide switch. The switch SW1 includes a first input terminal S1, a second input terminal S2, a first output terminal S3, a second output terminal S4, a first slide key S11, and a second slide key S12. The first input terminal S1 and the second input terminal S2 correspond to the first output terminal S3 and the second output terminal S4, respectively. The first slide key S11 controls connection and disconnection between the first input terminal S1 and the first output terminal S3. The second slide key S12 controls connection and disconnection between the second input terminal S2 and the second output terminal S4.

A first input pin Vin1 of the first buffer U2 is connected to the status pin ACTIVE of the control chip U1. A second input pin Vin2 of the first buffer U2 is grounded. A power pin VCC of the first buffer U2 is connected to a power source P5V_D. A ground pin GND of the first buffer U2 is grounded. An output pin Vout of the first buffer U2 is connected to the first input terminal S1 of the switch SW1. The first input terminal S1 of the switch SW1 is connected to the power source P5V_D through a resistor R1. The first output terminal S3 of the switch SW1 is connected to the status receiving pin RLED of the connector J1. The second input terminal S2 of the switch SW1 is connected to the power source P5V_D through a resistor R2. The second output terminal S4 of the switch SW1 is connected to an input pin Vin of the second buffer U3. A ground pin GND of the second buffer U3 is grounded. A power pin VCC of the second buffer U3 is connected to the power source P5V_D. An output pin Vout of the second buffer U3 is connected to the staggered spin-up pin STAGGER of the control chip U1.

In the embodiment, ground pins GND1, GND2, GND3, GND7, GND8, GND9, GND10, and GND11 of the connector J1 are all grounded. A voltage pin V5_P of the connector J1 is connected to the power source P5V_D through a resistor R3. Voltage pins V5_1 and V5_2 of the connector J1 are both connected to the power source P5V_D. A voltage pin V12_P of the connector J1 is connected to the power source P12V_D through a resistor R4. Voltage pin V12_1 and V12_2 are both connected to the power source P12V_D. The status receiving pin RLED of the connector J1 is grounded through a resistor R0 and a light emitting diode (LED) D0 connected in series. An anode of the LED D0 is connected to the status receiving pin RLED through the resistor R0. A cathode of the LED D0 is grounded.

In use, when normal operation of the HDD 100 is needed, the first slide key S11 of the switch SW1 is slid (or pressed) by a user, and controls the first input terminal S1 to be connected to the first output terminal S3. The second slide key S12 of the switch SW1 is slid (or pressed), and controls the second input terminal S2 to be disconnected from the second output terminal S4. The first buffer U2 receives a square wave signal, such as pulse width modulation (PWM) signal, from the status pin ACTIVE of the control chip U1. When the square signal is at a high level, such as logic 1, the first buffer U1 is turned on. The status receiving pin RLED of the connector J1 receives the high level signal of the square signal from the status pin ACTIVE of the control chip U1 through the buffer U2 and the switch SW1. The LED D0 connected to the status receiving pin RLED is illuminated to show that the state of the HDD 100 is normal operation.

When the square signal is at a low level, such as logic 0, the first buffer U1 is turned off. The status receiving pin RLED of the connector J1 receives a voltage of 5 volts (V) from the power source P5V_D through the switch SW1 and the resistor R1. The LED D0 is also illuminated to show that the state of HDD 100 is normal operation.

When the function of staggered spin-up of the HDD is needed, the second slide key S12 of the switch SW1 is slid by a user, and controls the second input terminal S2 to be connected to the second output terminal S4. The first slide key S11 of the switch SW1 is slid, and controls the first input terminal S1 to be disconnected from the first output terminal S3. The second buffer U3 receives the voltage of 5V from the power source P5V_D through the switch SW1 and the resistor R2, and transmits the voltage of 5V to the staggered spin-up pin STAGGER of the control chip U1. The control chip U1 controls the HDD 100 to carry out the function of the staggered spin-up, due to the staggered spin-up pin STAGGER operating at a high level.

When both of the functions of normal operation and staggered spin-up of the HDD 100 are both needed, the second slide key S12 of the switch SW1 is slid to control the second input terminal S2 to be connected to the second output terminal S4, and the first slide key S11 of the switch SW1 is slid to control the first input terminal S1 to be connected to the first output terminal S3. Therefore, the control chip U1 can control the HDD 100 to carry out the functions of normal operation and staggered spin-up at the same time.

The control circuit 10 can be applied in HDDs with different types of connectors, such as serial advanced technology attachment (SATA).

Therefore, the functions of normal operation and staggered spin-up of the HDD can be selected according to requirements.

While the disclosure has been described by way of example and in terms of preferred embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A control circuit for a hard disk drive, the control circuit comprising:
   a control chip comprising a status pin and a staggered spin-up pin;
   a connector configured to connect to the hard disk drive and a motherboard, wherein the connector is connected to the control chip; and
   a function switch unit connected between the control chip and the connector;
   wherein the status pin of the control chip is connected to a status receiving pin of the connector through the function switch unit, and sends an operation state signal of the hard disk drive to the status receiving pin of the connector; the staggered spin-up pin of the control chip receives a high level signal from the function switch unit, and controls the hard disk drive to execute a staggered spin-up function.

2. The control circuit of claim 1, wherein the function switch unit comprises a first buffer, a second buffer, and a switch, the switch comprises a first input terminal, a second input terminal, a first output terminal corresponding to the first input terminal, and a second output terminal corresponding to the second input terminal, a first input pin of the first buffer is connected to the status pin of the control chip, a second input pin of the first buffer is grounded, an output pin of the first buffer is connected to the first input terminal of the switch, both of the first input terminal and the second input terminal of the switch are connected to a first power source, the first output terminal of the switch is connected to the status receiving pin of the connector, the second output terminal of the switch is connected to an input pin of the second buffer, an output pin of the second buffer is connected to the staggered spin-up pin of the control chip.

3. The control circuit of claim 2, wherein the function switch unit further comprises a first resistor and a second resistor, the first input terminal of the switch is connected to the first power source through the first resistor, and the second terminal of the switch is connected to the first power source through the second resistor.

4. The control circuit of claim 3, wherein the switch is a slide switch.

5. The control circuit of claim 1, wherein a first data pin and a second data pin of the control chip are connected to a first sending pin and a second sending pin of the connector, respectively, a third data pin and a fourth data pin of the control chip are connected to a first receiving pin and a second receiving pin of the connector, respectively, a first voltage pin of the connector is connected to the first power source through a third resistor, a second voltage pin of the connector is connected to a second power source through a fourth resistor.

6. The control circuit of claim 5, wherein a voltage value of the first power source is 5 volts V), a voltage value of the second power source is 12V.

7. The control circuit of claim 1, wherein the status receiving pin of the connector is grounded through a fifth resistor and a light emitting diode (LED) connected in series, an anode of the LED is connected to the status receiving pin of the connector through the fifth resistor, a cathode of the LED is grounded.

* * * * *